United States Patent
Rajagopala-Rao et al.

(10) Patent No.: US 10,079,728 B2
(45) Date of Patent: Sep. 18, 2018

(54) SYSTEM AND METHOD FOR DISCOVERY OF DEVICES ON A NETWORK

(71) Applicant: VUDU, INC., Sunnyvale, CA (US)

(72) Inventors: Ananthapadmanab Rajagopala-Rao, San Bruno, CA (US); Wyatt Leung, Cupertino, CA (US)

(73) Assignee: VUDU, INC., Sunnyvale, CA (US)

( * ) Notice: Subject to any disclaimer, the term of this patent is extended or adjusted under 35 U.S.C. 154(b) by 228 days.

(21) Appl. No.: 14/543,437

(22) Filed: Nov. 17, 2014

(65) Prior Publication Data

US 2016/0142259 A1 May 19, 2016

(51) Int. Cl.
*H04L 12/24* (2006.01)
*H04L 12/28* (2006.01)

(52) U.S. Cl.
CPC .......... *H04L 41/12* (2013.01); *H04L 12/2809* (2013.01); *H04L 2012/2849* (2013.01)

(58) Field of Classification Search
CPC ..... H04L 12/40; H04L 41/12; H04L 12/2809; H04L 2012/2849
See application file for complete search history.

(56) References Cited

U.S. PATENT DOCUMENTS

| | | | | |
|---|---|---|---|---|
| 7,321,748 B2 * | 1/2008 | Tokoro | ............... | H04L 29/06027 348/E7.079 |
| 8,370,431 B1 * | 2/2013 | Wang | ................ | H04L 29/06421 709/203 |
| 9,277,260 B2 * | 3/2016 | Johansson | ........ | H04N 21/23106 |
| 2003/0172270 A1 * | 9/2003 | Newcombe | ........ | G06Q 20/3674 713/168 |
| 2007/0288656 A1 * | 12/2007 | Liang | ................ | H04L 29/12377 709/245 |
| 2009/0323555 A1 * | 12/2009 | Lancaster | ........... | H04L 41/0253 370/254 |
| 2013/0065585 A1 * | 3/2013 | Pelletier | ................. | H04W 4/02 455/435.1 |
| 2014/0057670 A1 * | 2/2014 | Lim | ...................... | H04W 8/005 455/509 |
| 2016/0094979 A1 * | 3/2016 | Naik | ...................... | H04W 8/18 455/414.1 |

* cited by examiner

*Primary Examiner* — Michael Thier
*Assistant Examiner* — Zhensheng Zhang
(74) *Attorney, Agent, or Firm* — Bryan Cave Leighton Paisner LLP (57) ABSTRACT

A connection is established between a first device and a server. When the first device opens the connection, the server determines the remote IP address of the first device. Determining the remote IP address can be performed in a variety of different manners. The first device is then tasked to determine its local IP address. The same steps can be repeated with a second device. Thereafter, either of the first device or the second device are able to query the server to find out if there is another device on the network. If one of the devices is capable of accepting incoming connections, the devices can communicate directly using the local IP addresses. Otherwise, messages can be sent through the server. The communication between the first and second devices can allow enhanced media viewing capabilities. Other embodiments are also disclosed herein.

22 Claims, 7 Drawing Sheets

SYSTEM AND METHOD FOR DISCOVERY OF DEVICES ON A NETWORK

TECHNICAL FIELD

This disclosure relates generally to computing, and relates more particularly to a system and method for discovering devices on a network.

BACKGROUND

In some networks, the ability to use multiple devices to connect to a network can be beneficial. It would be desirable to have a method and system for detecting other devices on a network for those and other purposes.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In some embodiments, a method can comprise: transmitting communication information from a first device to a requestor; transmitting a request to the requestor to connect the first device to a second device on a network; receiving communication information about the second device on the network; using the communication information to transmit data from the first device to the second device, without sending data outside the network; wherein: the first device and the second device are both coupled to the network; the network is coupled to an Internet connection; the communication information comprises one or more of the following: a local IP address, a remote IP address, and at least one timestamp indicating at least one time at which the remote and local IP address was transmitted.

In some embodiments, a system can comprise: one or more processing modules; and one or more non-transitory storage modules storing computing instructions configured to run on the one or more processing modules and perform the acts of transmitting communication information from a first device to a requestor; transmitting a request to the requestor to connect the first device to a second device on a network; receiving communication information about the second device on the network; using the communication information to transmit data from the first device to the second device, without sending data outside the network; wherein: the first device and the second device are both coupled to the network; the network is coupled to an Internet connection; the communication information comprises one or more of the following: a local IP address, a remote IP address, and at least one timestamp indicating at least one time at which the remote and local IP address was transmitted.

In some embodiments, a method can comprise: establishing a connection with a first device; determining a remote Internet Protocol (IP) address of the first device; establishing a connection with a second device; determining a remote IP address of the second device; requesting a local IP address of the first device; requesting a local IP address of the second device; storing first connection information for the first device; storing second communication information for the second device; determining that the first device and the second device are operating on a single local network; and using the first communication information and second communication information to allow the first device to communicate to with the second device without sending data outside of the single local network; wherein: the first device and the second device are both coupled to a first network; the first communication information comprises the remote IP address of the first device, the local IP address of the first device, and at least one timestamp indicating at least one time at which the remote and local IP address of the first device was received.

In some embodiments, a system can comprise: one or more processing modules; and one or more non-transitory storage modules storing computing instructions configured to run on the one or more processing modules and perform the acts of: establishing a connection with a first device; determining a remote Internet Protocol (IP) address of the first device; establishing a connection with a second device; determining a remote IP address of the second device; requesting a local IP address of the first device; requesting a local IP address of the second device; storing first connection information for the first device; storing second communication information for the second device; determining that the first device and the second device are operating on a single local network; and using the first communication information and second communication information to allow the first device to communicate to with the second device without sending data outside of the single local network; wherein: the first device and the second device are both coupled to a first network; the first communication information comprises the remote IP address of the first device, the local IP address of the first device, and at least one timestamp indicating at least one time at which the remote and local IP address of the first device was received.

Figure 1:
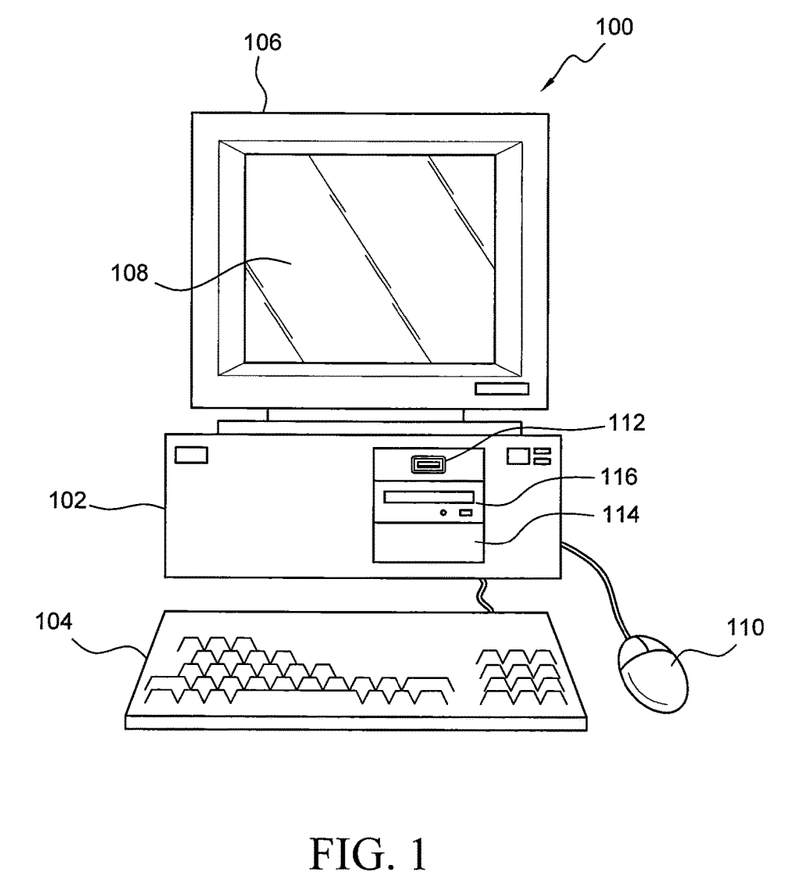
FIG. 1 illustrates a front elevation view of a computer system that is suitable for implementing an embodiment of the system disclosed in FIG. 3.
Figure 2:
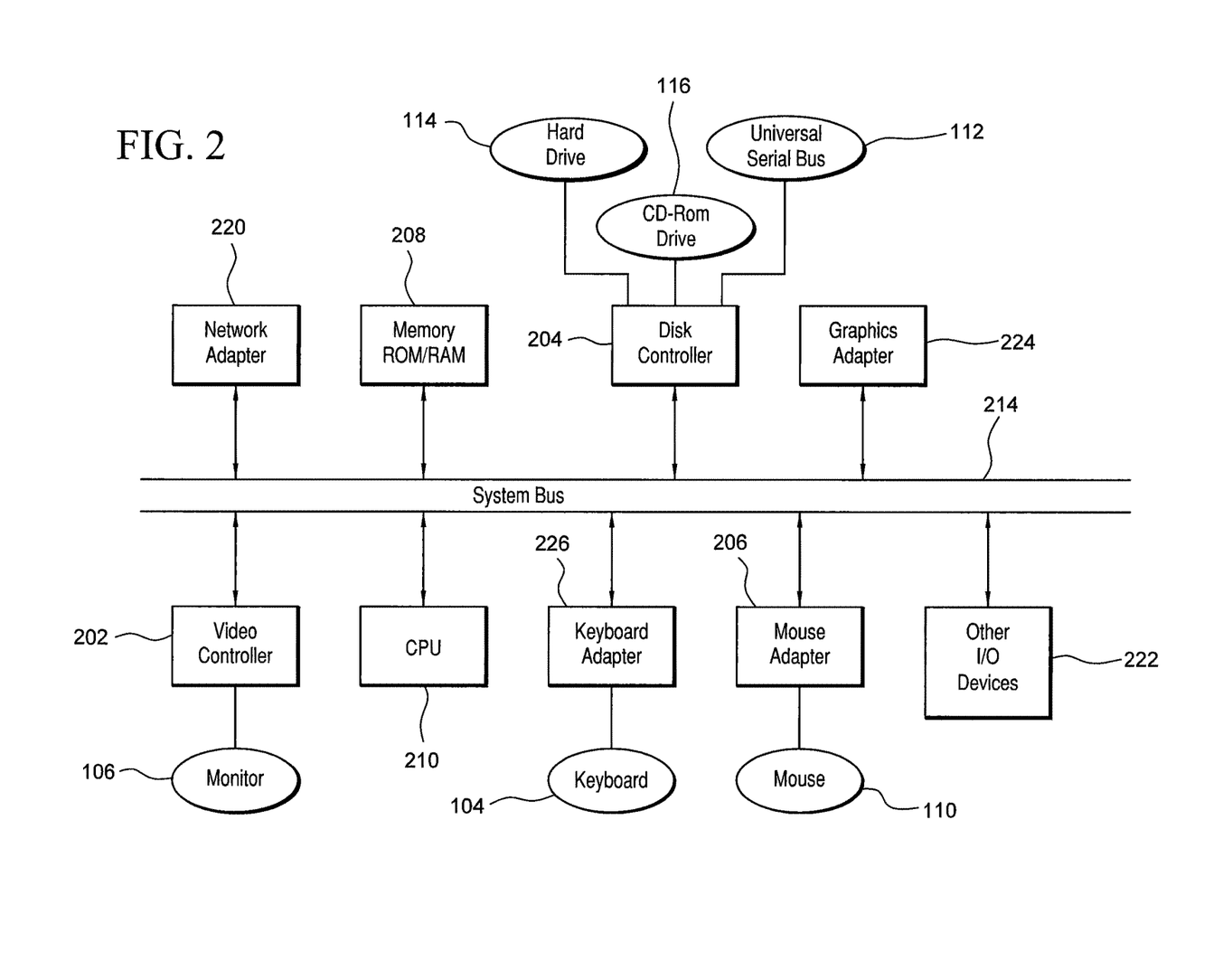
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device such as, an external memory storage unit (not shown) coupled to universal serial bus (USB) port 112 (FIGS. 1-2), hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system (OS), which can be a software program that manages the hardware and software resources of a computer and/or a computer network. The OS can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® (OS), Apple® OS X, Apple® iOS, Google® Android®, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is configured to allow monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. In certain embodiments, computer system 100 can comprise a general-purpose computer. In certain other embodiments, computer system 100 can comprise a special-purpose computer, such as a set-top box. It should also be understood that a particular configuration of computer system 100 may or may not contain each of the items shown in FIG. 1 or 2 or may in fact contain multiple of each of the items shown in FIG. 1 or 2. For example, certain implementations of computer system 100 may not contain a CD-ROM, DVD, or Blu-ray drive 116. Other implementations of computer system 100 may contain two CD-ROM, DVD, or Blu-ray drives 116. Other implementations of computer system 100 can contain two or more monitors 106. Other implementations of computer system 100 could contain no monitors. Other implementations of computer system 100 can contain equivalents to certain items. For example, hard drive 114 can be replaced or augmented by a solid-state drive (SSD).

Consumers are increasingly using mobile and other external devices as a "second screen" while watching television (TV). Using a mobile device while watching TV in a coordinated fashion can improve the user's watching experience. The devices involved can be of several types (e.g., TVs, Blu-ray players, tablets, phones, laptop computers), each capable of accomplishing certain tasks better than the others. Exemplary tasks that can be completed in such a manner can include the following:

Using a smartphone/tablet to control playback of a movie or TV show on a big screen device like a High Definition Television (HDTV).

Using a mobile device with a keyboard for searching for content and displaying the search results on a big screen device more easily. Many on-screen keyboards for TVs require the use of arrow keys to navigate through an on-screen keyboard, which is much more time consuming than using a touch-screen display with a touch-screen keyboard, such as those present on a smartphone or tablet or a physical mouse/keyboard, such as one on a laptop computer.

Using a mobile device with a good microphone for voice commands Smartphones and tablets typically have microphones, as do some video game consoles. Utilizing the voice recognition capabilities of Android's OK Google, iOS's Siri, or Windows Phone's Cortana can allow a user to, for example, pause content, change channels, change volume, and the like, using only voice commands without the need for pressing buttons on a remote.

Using a mobile device to display related information to the content being displayed on a big screen. This "second screen" can be used for a variety of uses. For example, showing more detailed statistics or alternate views of a sporting event or production information (actors, directors, etc.) of a movie.

Interacting with social media from a mobile device while watching content on a bigger screen. For example, a user can make a post on Facebook, Instagram, Twitter, and the like indicating that he/she is watching a particular movie/TV show, thus initiating a conversation with his/her friends and followers.

Current Approaches

To facilitate such second screen applications, desirable features can include the following:

the ability to discover the presence of another compatible device; and the ability to communicate another device with low overhead.

There are several solutions that can achieve this by using a combination of broadcast, multicast and unicast messages on the local network, such as Universal Plug and Play (UPnP), and the like. However they have the several limitations, including, but not limited to, the following:

The existing solutions require complete control over the network stack on the client devices. This may not be possible for 3rd parties writing applications that run on TV/phone/tablet/game console. The reason is that application programming interfaces (APIs) usually are available for standard protocols used to communicate with a server, but advanced functions like broadcast/multicast/user datagram protocol (UDP) might be hidden for security reasons and for simplicity. In other words, a typical "smart TV" or set-top box might not have access to such advanced functions.

All client devices should support the same protocol for discovery. However, the streaming eco-system is currently fragmented into several different protocols, since there are multiple competing approaches.

Some network routers and/or firewalls might block multicast, broadcast, and/or UDP messages. In this situation, it might not be possible for a TV or set-top box to communicate with other devices because of the inability of the TV or set-top box to transmit or receive the messages necessary for such communications.

To overcome the above situations (and other situations that can occur), some embodiments can use a variety of different techniques to overcome such situations. In some embodiments, a service running in the cloud can be used to facilitate discovery of client devices on the same network, instead of relying solely on communications within a local area network (LAN).

Figure 3:
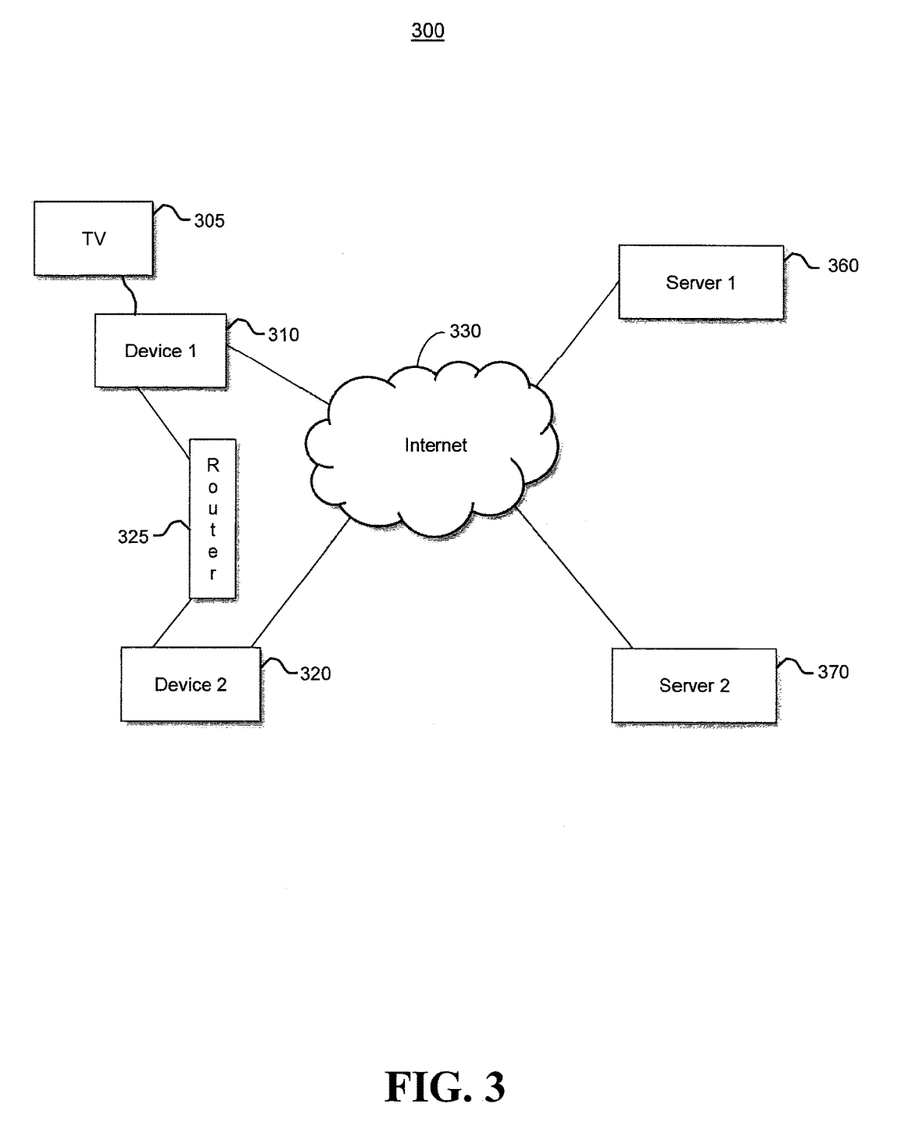
FIG. 3 illustrates a block diagram of an exemplary system capable of performing an embodiment.

With reference to FIG. 3, a block diagram illustrating a system 300 in which an embodiment can operate is presented. As discussed above, embodiments can be used to view media on a TV 305. A first device 310 can be coupled to TV 305. First device 310 can take many different forms. For example, first device 310 can be a set-top box, a video game console, a laptop computer, a desktop computer, a DVD player, a Blu-ray player, a tablet, and the like. In some embodiments, TV 305 can be a "smart TV." In such a situation, features of first device 310 can be integrated into TV 305. Second device 320 can be another device that is configured to access the Internet. Exemplary form factors for second device 320 include a smartphone, a tablet, a laptop computer, and the like. TV 305 can be any type of display. Exemplary displays include television sets, computer monitors, tablets, laptop screens, and the like.

Both first device 310 and second device 320 are coupled to router 325. First device 310, second device 320, and router 325 can be collectively referred to as a LAN. As is commonly known, a router such as router 325 is a networking device that forwards data between computer networks. Router 325 is coupled to Internet 330. In some embodiments, the coupling between first device 310 and router 325 can be wired, such as via Ethernet. In some embodiments, the coupling between first device 310 and router 325 can be wireless, such as via WiFi. In some embodiments, the coupling between second device 320 and router 325 can be wired, such as via Ethernet. In some embodiments, the coupling between second device 320 and router 325 can be wireless, such as via WiFi. In some embodiments, there could be an intermediate device between device 310 or device 320 and router 325, such as a switch or a firewall. In some embodiments, router 325 is an integrated device with multiple features built into a single package. While described as a router, other devices with similar capabilities can be used in place of router 325. For example, router 325 can act as a router (connecting the home network to the Internet), as a switch (which couples individual devices within a network to each other), as a wireless access point (WAP), which wirelessly connects multiple devices, and/or as a cable modem (coupling an Ethernet network with a coaxial network). Such a configuration can be common in many home networking situations. Intermediary devices such as those described above are not shown in FIG. 3 to simplify the drawings.

First server 360 and second server 370 are also coupled to Internet 330. (There can be routers, firewalls, switches, and other Internet-connectivity devices between first server 360 and Internet 330 and between second server 370 and Internet 330.) In some embodiments, first device 310 and second device 320 are each coupled to different servers, through Internet 330. For example, first device 310 can be coupled to first server 360 while second device 320 is coupled to second server 370. In some embodiments, both first device 310 and second device 320 are coupled to the same server (for example, first server 360). In some embodiments, first server 360 and second server 370 are part of a cloud computing arrangement, such that servers can be dynamically allocated for various purposes as needed.

In some embodiments, first server 360 and second server 370 can be configured to stream or otherwise transmit (for download) media content to first device 310 and/or second device 320. In some embodiments, streaming to first device 310 is performed in order to view media on TV 305. First server 360 and second server 370 can both be servers configured to perform a streaming service. Thus, first server 360 and second server 370 can have access to information regarding a user's account. In addition, first server 360 and second server 370 can both be capable of transmitting or streaming media files to first device 310 or second device 320. In some embodiments, first server 360 and second server 370 can be a part of a cloud computing arrangement, such that servers within the cloud computing arrangement can be dynamically allocated for various purposes as needed.

In typical usage, a user uses first device 310 to select a media file to play. First server 360 or second server 370 can be configured to display available choices to the user. After a user indicates his selection, first server 360 or second server 370 can be configured to stream or otherwise transmit one or more media files corresponding to the selection made by the user to first device 310. After receiving the one or more media files, first device 310 is configured to display the media file to the user on TV 305.

Such a user experience can be augmented through the use of a "second screen." Various use cases of a second screen were detailed above. However, before using a second screen, it can be desirable to discover the presence of another device that can operate as a second screen or in conjunction with a second screen.

Figure 4:
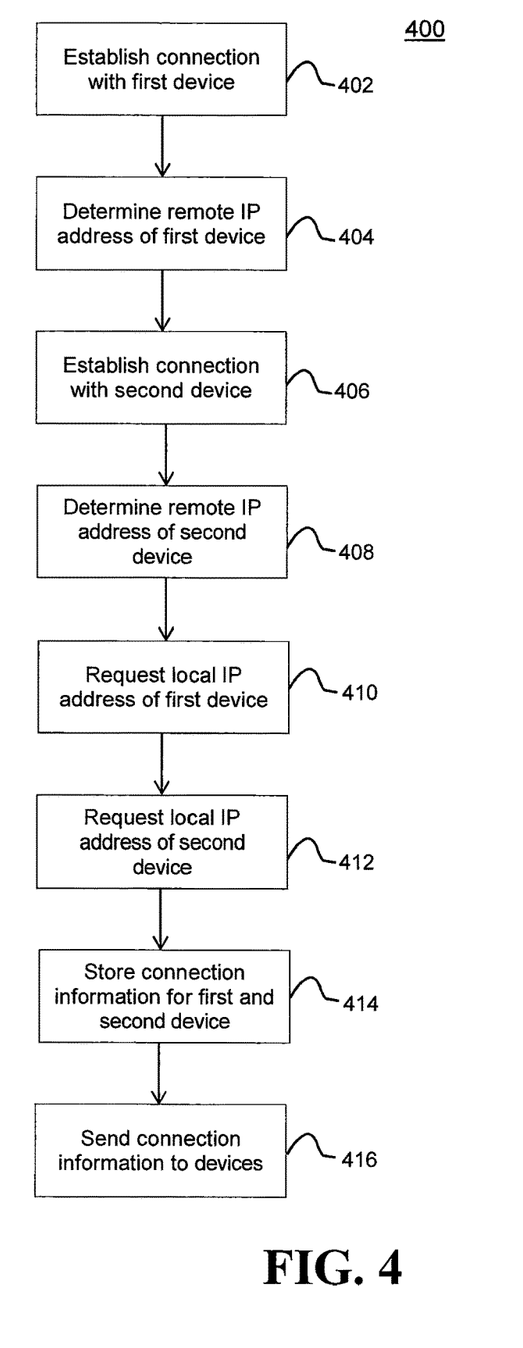
FIG. 4 illustrates a flowchart for an exemplary method of performing a method for the discovery of devices on a network.

With reference to FIG. 4, a flowchart illustrating the operation of a method 400 to discover devices on a network is disclosed. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, method 400 can be implemented by computer system 100 (FIG. 1).

A connection is opened between a first device and a server (block 402). This connection can be established in a variety of different ways. For example, signing into the streaming service using a web browser or using an "app" on an Internet-connected device can establish a connection between the streaming service of which the first server is a part and the first device. The remote Internet Protocol (IP) address of the first device is determined (block 404). A connection is opened between a second device and the server (block 406) in a manner similar to that described above. The remote Internet Protocol (IP) address of the second device is determined (block 408).

A request is sent to the first device to request the local IP address of the first device (block 410). In this sense, a server, such as server 360 from FIG. 3, is the requestor. The first device can obtain its local IP address in a variety of different manners, such as using a particular command in its platform API. Returning to FIG. 4. A similar request is sent to the second device to request the local IP address of the second device (block 412). As an example, the first device of method 400 can be similar to first device 310 (FIG. 3) and the second device of method 400 can be similar to second device 320 (FIG. 3).

In some embodiments, the connection to the first device can be with a first server and the connection to the second device can be with a second server. In some embodiments, the first server and the second server can be part of the same network. In some embodiments, the first server and the second server can be a part of a cloud network, such that the first server and second server can be dynamically assigned to the first device and the second device. In some embodiments, both the connection to the first device and to the second device can be with the same server (such as either one of server 360 or server 370 of FIG. 3).

The following is a brief explanation of a distinction between remote IP addresses and local IP addresses. Each of the first device and the second device can have both a remote IP address and a local IP address. This may be due to a scheme such as Network Address Translation (NAT).

There may be one of several reasons for a network to use Network Address Translation (NAT). Exemplary reasons include privacy reasons and to increase the number of available connections to the Internet. If a computer's IP address was publicized, then anyone who knew the computer's IP address could access that computer and perform nefarious activities, such as installing malware on the computer or using the computer to commit cyber-crimes. In addition, for home networks, each home is typically provided with only a single Internet connection. Therefore, a mechanism might be desired to put multiple devices on the single Internet connection.

What NAT provides is that a device can be connected to the Internet using a remote IP address, but is accessible to other computers on its network using a local IP address. A router with NAT capabilities can be used to translate remote IP addresses to local IP addresses, and vice versa. Using NAT, a hacker with knowledge of a particular device's remote IP address will typically not be able to perform nefarious activities on that remote IP address, because a router connecting the device to the Internet or a firewall can be configured to prevent all accesses to the remote IP address except for certain connections. The methodology to create remote IP addresses and local IP addresses can include assigning a local IP address to each device within the network. For example, a network, such as a home network, can have each device on the network have its own distinct local IP address. For example, with reference to FIG. 3, device 310 might have the local IP address of 192.0.2.53 while device 320 might have the local IP address 192.0.2.79.

However, to other devices on the Internet, each of those devices can be assigned a different remote IP address, possibly each device having the same remote IP address with a different port (for example, using a Port Address Translation (PAT) scheme). For example, device 310 might be using remote IP address 198.51.100.156 with port number 59310, while device 320 might be using remote IP address 198.51.100.156 with port number 61429.

A device that is external to the home network (such as server 360), typically has access to a device's remote IP address, but does not have access to the device's local IP address. So if server 360 wanted to send data to device 310, it would send data to 198.51.100.156:59310 and if server 360 wanted to send data to device 320, it would send data to 198.51.100.156:61429.

But locally, devices 310 and 320 might not have access to the remote IP address of other devices on the LAN. If device 310 needed to send data to device 320, it would send the data to the local IP address of device 320 (192.0.2.79). It could send data to device 320 via the remote IP address, but such a transmission would take longer because the transmission would have to leave the single local network first, get sent to the Internet, then get routed back to the LAN, instead of the transmission remaining exclusively local to the LAN. In addition, device 310 might not be aware of the remote IP address of device 320. Indeed, device 310 might not even be aware of its own remote IP address, because a command such as ipconfig does not return a device's remote IP address, only the device's local IP address. While some devices can determine its remote IP address relatively easily, other devices have restricted access to the Internet and might not have access to its remote IP address.

It should be understood that there could be other schemes that result in a device having both a remote IP address and a local IP address. For example, many implementations of IP version 6 (IPv6) assign a temporary IPv6 addresses to a device so that the permanent IPv6 address of the device is not revealed to the Internet as a whole. For example, a device with a local IPv6 address of 2001:db8:e89d:8ae2:3cad:f3fc:9bed:b883 can have a temporary IPv6 address of 2001:db8:6388:c7d4:8a7b:944:c62d:a3db. Other schemes that assign both remote IP addresses and local IP addresses can be used. When communicating within the local network, other devices could use the local IPv6 address, but computers outside the network would use the device's remote IPv6 address to communicate with it.

In some embodiments, a device might not know its remote IP address, but can access its local IP address very easily (e.g., through the use of a command similar in function to ipconfig or ifconfig). Similarly, a device outside the network (such as server 360 or server 370, with reference to FIG. 3), can easily determine the remote IP address of the an external device (such as device 310 or device 320), but might not be able to determine the local IP address of the external device.

In addition to the remote and local IP addresses of the first device and the second device, other information related to the first device and second device can also be gathered. For example, the service set identification (SSID) used by the first device and the SSID used by the second device can be requested and stored. As is known to those of skill in the art, an SSID is the name of the WiFi network to which a device is connected. One reason for making such a request could be to use the SSID as a confirmation that the first device and the second device are on the same network (as opposed to merely being two devices that are in proximity to each other, but are operating on different networks). For similar reasons, the media access control (MAC) address of the first device and second device can be stored. As is well known, a MAC address is a 48-bit unique identifier that uniquely identifies every device that connects to the Internet. In some embodiments, the MAC address could be used as a "white-list." In other words, there could be a list of MAC addresses that is stored on the first server or the second server. Only a second device whose MAC address is on the list of MAC addresses would be allowed to operate with the first device. In some embodiments, such a white-list can be created dynamically, such that if a particular device had connected to a particular server before, that device has a known MAC address and can be associated with a particular network.

With continued reference to FIG. 4, after obtaining both the local IP address and remote IP address for the first device, that communication information is stored, along with a timestamp indicating when the communication information was obtained (block 414). The same communication information can be stored for the second device also. The timestamp can be used to determine how old the data is. As described above, some devices can change their remote IP address on a regular basis. In addition devices can sometimes be given a different local IP address each time it connects to a network, depending on the settings of the network. Thus, the timestamp helps an embodiment determine if the stored data is old or not. In some embodiments, if the data is older than a certain amount of time, the remote IP address and local IP address of the first device and/or second device can be re-retrieved. In one embodiment, there can be one timestamp for both the local and remote IP addresses. In one embodiment, there can be a separate timestamp for each of the local and remote IP addresses.

The communication information for both the first and second devices can then be sent to either one of the first device or the second device for further communication (block 416). In some embodiments, the communication information can be sent to both the first device and the second device.

While the method and system described above refers to a first device and a second device and a first server and a second server, it should be understood that the steps described above could be expanded to include a third device and/or more devices, as well as a third and/or more servers.

Other data also can be stored as part of the communication information. As described above, the MAC address can be used as an aid to speed the connection between a device (such as devices 310 or 320, with reference to FIG. 3) and a server (such as servers 360 or 370). For example, the MAC address of each device that is connected to a server using a particular account can be stored. The SSID can also be part of the communication information.

After the communication information, including the remote IP address and local IP address for both the first device and the second device are stored, either one of the first device or the second device can use the communication information for enhanced communication between the first device and the second device.

Figure 5:
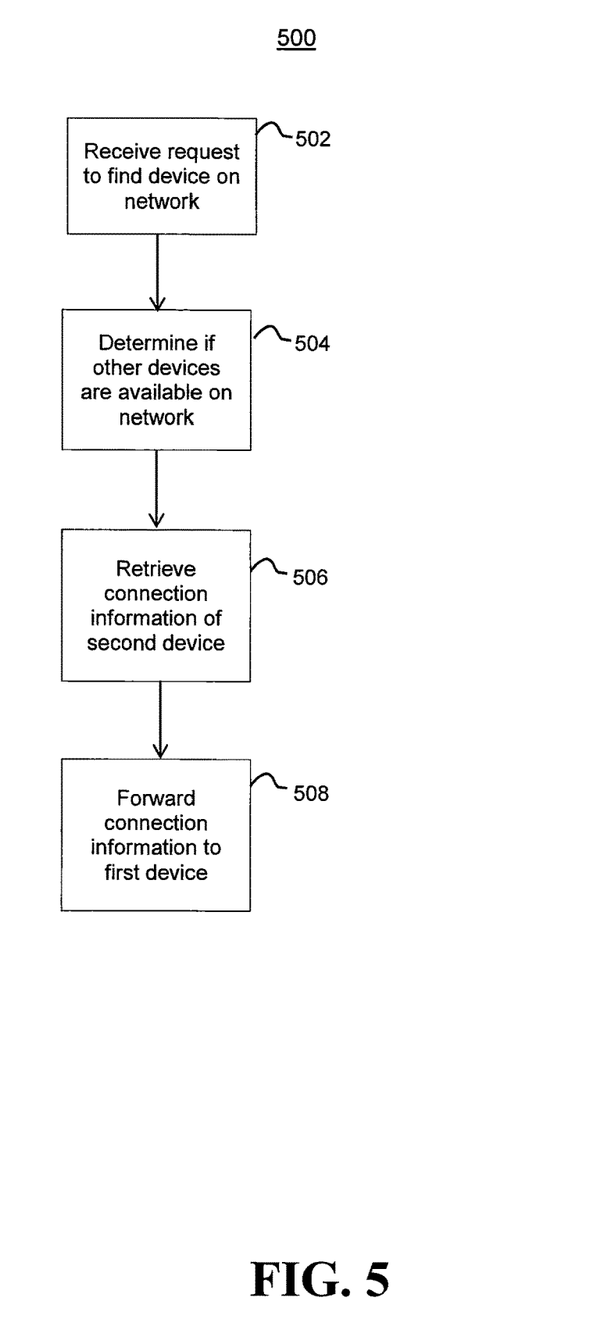
FIG. 5 illustrates a flowchart for an exemplary method of communicating between two devices on a network in an embodiment.

With reference to FIG. 5, a flowchart illustrating a possible method 500 for communication between a first device and a second device using an embodiment is presented. Method 500 is merely exemplary and is not limited to the embodiments presented herein. Method 500 can be employed in many different embodiments or examples not specifically depicted or described herein. In some embodiments, the procedures, the processes and/or the activities of method 500 can be performed in the order presented. In other embodiments, the procedures, the processes, and/or the activities of method 500 can be performed in any other suitable order. In still other embodiments, one or more of the procedures, the processes, and/or the activities of method 500 can be combined or skipped. In some embodiments, method 500 can be implemented by computer system 100 (FIG. 1).

Referring back to FIG. 5, an embodiment can receive a request from the first device requesting to find other devices it can communicate with (block 502). An embodiment determines which devices on the network of the first device are capable of communicating with the first device (block 504). This can happen in a variety of different manners. For example, the connection information of the first device can be compared to the connection information of other devices that currently have an active connection (with reference to FIG. 4, at block 414, connection information for every device with an open connection is stored in some embodiments). By comparing the remote IP addresses and local IP addresses that have been stored in an embodiment, it can be determined which devices are local to each other. For example, if two devices have the same remote IP address, but are using different ports, the two devices could be on the same network. Similarly, if two devices have the same prefixes for their local IP addresses, that is another indication that the two devices could be on the same network. Other connection information such as MAC addresses and SSIDs can be used to further refine such determinations. As described above, if two devices are using the same SSID, that is a strong indication that the two devices are on the same network. In another embodiment, if two devices have been connected via an embodiment in the past, the MAC address of the device with which it is connected had been noted. Thus, the presence of a device with that same MAC address also is an indication that a device is on the same network as the requesting device. The fact that two devices are both logged in to the same account at a streaming provider also can be used as an indication that the devices are on the same local network. In some embodiments, however, merely using the same account might not be enough. For example, a person could be sharing their account with a child who is in another state (e.g., the child is in college). In such a situation, it might not be desirable to have these two devices be capable of actions such as those described herein. On the other hand, other embodiments might allow such an interaction to allow the users who are remote to each other to have a shared experience of viewing the same media file in synchronization with each other.

With continued reference to FIG. 5, once it has been determined that a second device is on the same network as the first device, the connection information of the second device is retrieved from storage (block 506). The connection information can include the information gathered that is described above, including, but not limited to, the local IP address, the remote IP address, the MAC address, the SSID, and the timestamp. Thereafter, the connection information of the second device is forwarded to the first device (block 508).

The first and second devices for method 500 can be similar to first and second devices 310 and 320, respectively. While FIG. 5 describes a connection requested by the first device to communicate with the second device, a similar procedure can be used for a connection request by the second device to communicate with the first device. In other words, method 500 operates whether it is the first device or the second device that initiates a communication request. In addition, while FIG. 5 describes a situation involving two devices, in some embodiments there can be three or more devices that are desiring to communicate with each other.

The first device can use this information for a variety of different purposes. For example, in some embodiments, using the local IP address of the second device, the first device can send messages directly to the second device without the need to first send information to the first or second server. It should be understood that "directly" can mean without sending information through the Internet. In some embodiments, the first device and second device can be coupled to each other via a mesh network topology, such that communications take place between the first device and the second device without an intermediary device. With reference to FIG. 3, in some embodiments, the first device (such as first device 310) and second device (such as second device 320) can both be coupled to a switch or to a WAP (such as router 325, which, in some embodiments, can be an integrated device, with features of a router, a switch, and a WAP). This coupling can be wired (such as via Ethernet) or wireless (such as via WiFi). Messages can be sent from the first device to the second device through the switch or WAP without the need for the message to go through Internet 330.

Communications between the first and second device can be accomplished, for example, when either device is capable of running a web server. Many smartphone/tablet applications can run a web server inside their sandbox (a security mechanism some applications use for executing certain programs without giving those programs access to the entire device). In this case, the first device can obtain the IP address and port number of the second device running a web server, using the methods described above. With the IP address & port information, the first device can connect to the second device, running the web server, to directly send and receive messages.

In some embodiments, after receiving a request from the first device 310 to communicate with the second device 320, server 360 can receive a message from first device 310 and forward the message directly to the second device 320. This can be used in a case where the second device is not configured to allow direct communication from another device in the same local network. Such a situation can occur in some set-top boxes because, for security reasons, the set-top box might be configured not allow other devices to directly communicate with the set-top box. This might be less desirable than a direct connection between the first device 310 and the second device 320, due to the added latency of communicating through the server 360, especially if the connection is already being used to stream media files.

In some embodiments, the first device can send status information to the first server. The status information can include, but is not limited to, information regarding which media file is being accessed and the current viewing position of the media file (such as the elapsed time of the media file). Thereafter, the first server could use the status information to send related data to the second device.

The messages between the first device and the second device can serve a variety of different purposes. For example, in some embodiments, the first device can act as a remote control to the second device. In other words, the first device can provide instructions to the second device, such as starting a media file, stopping a media file, or selecting a movies to watch.

In some embodiments, the first device can provide information to the second device indicating the elapsed time of a movie being watched. Thereafter, the second device can use the information to include information that is relevant during that elapsed time. For example, at 30 minutes into a particular movie, there could be a scene that is noteworthy. The second device can display information related to that scene. Therefore, the user could use the second device to learn information about the scene.

Other use cases are also possible. For example, a user could use the first device (such as a tablet or smartphone) to select a movie, then send a message to the second device (such as a smart TV or a set top box coupled to a TV) to turn the TV on and/or change the settings of the TV to view the streaming app. Thereafter, the first device could provide instructions to the second device to begin playback of a media file. In some embodiments, the first device could display instructions to the user as to how to turn on the TV and set the TV to view the streaming app.

In some embodiments, the first device could be a smart TV or a set top box coupled to a TV, and the second device could be a smartphone or tablet. The first device could request that a server simultaneously play a media file on the second device. The second device also could be another set top box connected to a second TV. In such a case, the second device could be used to view the media file on the second TV simultaneously.

In some embodiments, the second device (such as a smartphone or tablet) could receive notifications if certain events occur on the first device. One such use case could be to issue a warning to parents if the first device was no longer in a "kid's" mode, thus prompting the parent to determine what is happening on the TV. In such an embodiment, certain conditions could be pre-set into the first device. As described above, the condition could include viewing in the wrong mode, indicating the playing of the media file has ended, or noting that an attempt is being made to purchase content. When such a condition is encountered, the first device could send a message, either directly to the second device or through a server, causing the second device to display a message and/or sound an alert.

In some embodiments, the first device could request a server to provide audio only to a second device. In such a manner, a user could watch a media file on a TV with the TV muted, then use her smartphone or tablet to listen to the movie (possibly using headphones), which would be in sync with the TV due to time signals being transmitted either by the first device or by the server to the second device.

In some embodiments, a user could be viewing a media file via a first device connected to a TV and using a second device (such as a smartphone or tablet) to view a social media app. The user could make comments on a certain scene using a social media app on his smartphone or tablet. Due to data shared between the first device and the second device (either sent directly between the first device and the second device or through a server), the comments can be specific to the time of the movie. Thereafter, when a friend or follower on the social media network watches the same movie and reaches the scene in question, the user's comments can be displayed to the friend or follower. For example, at 40 minutes into a particular media file, a user can enter a comment such as, "remember the protaganist's actions in this scene." Thereafter, when a friend or follower is watching the same media file and reaches the 40 minute mark, the social media app can be instructed to show the user's comment to the friend/follower.

Figure 6:
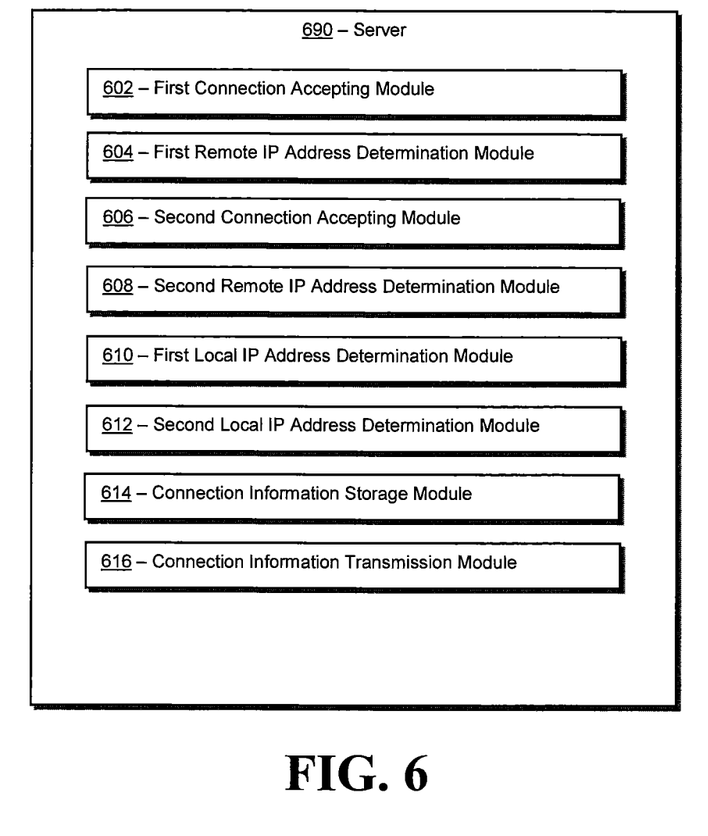
FIG. 6 illustrates a block diagram of an exemplary server, according to an embodiment.

Turning ahead in the figures, FIG. 6 illustrates a block diagram of a server 690 that is capable of performing disclosed embodiments. Server 690 is merely exemplary and is not limited to the embodiments presented herein. Server 690 can be employed in many different embodiments or examples not specifically depicted or described herein. In some embodiments, certain elements or modules of server 690 can perform various procedures, processes, and/or acts. In other embodiments, the procedures, processes, and/or acts can be performed by other suitable elements or modules.

In a number of embodiments, server 690 can include a first connection accepting module 602. In certain embodiments, first connection accepting module 602 can perform block 402 (FIG. 4) of opening a connection between a first device and server 690.

Returning to FIG. 6, in some embodiments, server 690 also can include a first remote IP address determination module 604. In certain embodiments, first remote IP address determination module 604 can perform block 404 (FIG. 4) of determining the remote IP address of a first device.

Returning to FIG. 6, in a number of embodiments, server 690 can include a second connection accepting module 606. In certain embodiments, second connection accepting module 606 can perform block 406 (FIG. 4) opening a connection between a second device and server 690.

Returning to FIG. 6, in some embodiments, server 690 also can include a second remote IP address determination module 608. In certain embodiments, second remote IP address determination module 608 can perform block 408 (FIG. 4) of determining the remote IP address of a second device.

Returning to FIG. 6, in some embodiments, server 690 also can include a first local IP address determination module 610. In certain embodiments, first local IP address determination module 604 can perform block 410 (FIG. 4) of determining the local IP address of a first device.

Returning to FIG. 6, in some embodiments, server 690 also can include a second local IP address determination module 612. In certain embodiments, second local IP address determination module 612 can perform block 412 (FIG. 4) of determining the remote IP address of a first device.

Returning to FIG. 6, in some embodiments, server 690 also can include a connection information storage module 614. In certain embodiments, connection information storage module 614 can perform block 414 (FIG. 4) of storing connection information for the first device and second device.

Returning to FIG. 6, in some embodiments, server 690 also can include a connection information transmission module 616. In certain embodiments, connection information transmission module 616 can perform block 416 (FIG. 4) of sending connection information to the first and second device.

Figure 7:
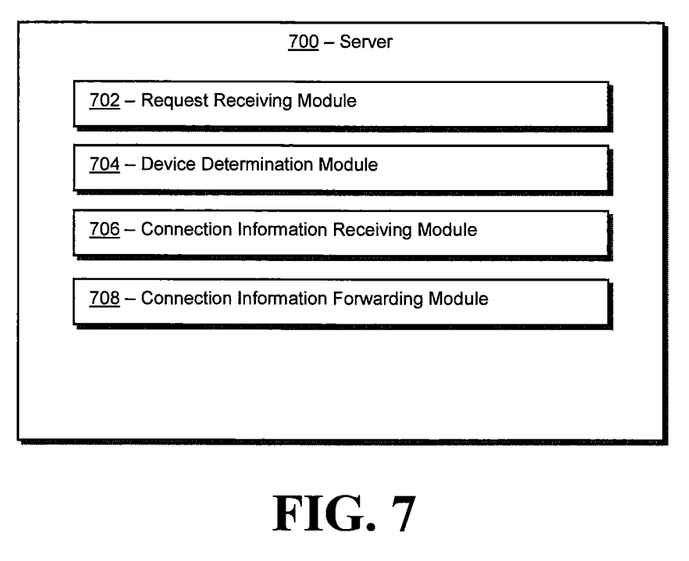
FIG. 7 illustrates a block diagram of an exemplary device, according to an embodiment.

Turning ahead in the figures, FIG. 7 illustrates a block diagram of a server 700 that is capable of performing disclosed embodiments. Server 700 is merely exemplary and is not limited to the embodiments presented herein. Server 700 can be employed in many different embodiments or examples not specifically depicted or described herein. In some embodiments, certain elements or modules of server 700 can perform various procedures, processes, and/or acts. In other embodiments, the procedures, processes, and/or acts can be performed by other suitable elements or modules.

In a number of embodiments, server 700 can include a request receiving module 702. In certain embodiments, request receiving module 702 can perform block 502 (FIG. 5) of receiving a request to find a device on a network.

Returning to FIG. 7, in some embodiments, server 700 also can include a device determination module 704. In certain embodiments, device determination module 704 can perform block 504 (FIG. 5) of determining if there are other devices on a network.

Returning to FIG. 7, in a number of embodiments, server 700 can include a connection information receiving module 706. In certain embodiments, connection information receiving module 706 can perform block 506 (FIG. 5) of receiving connection information from a second device.

Returning to FIG. 7, in some embodiments, server 700 also can include a connection information forwarding module 708. In certain embodiments, connection information forwarding module 708 can perform block 508 (FIG. 5) of forwarding connection information to a second device.

Although the above embodiments have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 1-7 may include different procedures, processes, and/or activities and be performed by many different modules, in many different orders.

While certain embodiments were described as operating for the usage of video content streaming over the Internet, it should be understood that the concepts, methods, and systems described herein are not limited to such a usage.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
   establishing a first connection with a first device;
   determining a first remote Internet Protocol (IP) address of the first device;
   establishing a second connection with a second device;
   determining a second remote IP address of the second device;
   requesting a first local IP address of the first device;
   requesting a second local IP address of the second device;
   storing first communication information for the first device, the first communication information comprising the first local IP address and at least one first timestamp indicating at least one time at which the first local IP address of the first device was received;
   storing second communication information for the second device, the second communication information comprising the second local IP address and at least one second timestamp indicating at least one time at which the second local IP address of the second device was received;
   determining that the first device and the second device are operating on a local network; and
   using the first communication information and the second communication information to allow the first device to communicate with the second device and also transmit data from the first device to the second device without sending the data outside of the local network, the data comprising information related to a media file being played by the first device and configured to allow the second device to communicate the information related to the media file being played by the first device, the information related to the media file being played by the first device comprising:
   (a) a social media comment made by a first social media account about contents of the media file being played by the first device, wherein a second social media account logged into a social media application on the second device is subscribed to the first social media account; and
   (b) one or more of:
      (1) first instructions for the second device to act as a remote control for the first device;

(2) second instructions for the second device to simultaneously play the media file being played by the first device;
(3) information indicating that the second device is not authorized to play the media file being played by the first device;
(4) information indicating an elapsed time of the media file being played by the first device;
(5) third instructions for the second device to play audio associated with the media file being played by the first device, wherein when the second device plays the audio associated with the media file being played by the first device, the first device is muted; or
(6) fourth instructions for the second device to simultaneously play the audio associated with the media file being played by the first device.

2. The method of claim 1 further comprising:
requesting a first service set identification (SSID) to which the first device is connected;
requesting a second SSID to which the second device is connected; and
confirming that the first SSID is the same as the second SSID before forwarding the second local IP address of the second device to the first device.

3. The method of claim 1 further comprising:
requesting a first media access control (MAC) address associated with the first device; and
requesting a second MAC address associated with the second device.

4. The method of claim 1 further comprising:
determining how old the first local IP address is using the at least one first timestamp;
determining how old the second local IP address is using the at least one second timestamp;
requesting first updated communication information from the first device if the first local IP address is determined to be older than a predetermined amount of time; and
requesting second updated communication information from the second device if the second local IP address is determined to be older than a certain amount of time.

5. The method of claim 1, wherein the information related to the media file being played by the first device comprises:
(1) the first instructions for the second device to act as the remote control for the first device;
(2) the second instructions for the second device to simultaneously play the media file being played by the first device;
(3) the information indicating that the second device is not authorized to play the media file being played by the first device;
(4) the information indicating the elapsed time of the media file being played by the first device;
(5) the third instructions for the second device to play the audio associated with the media file being played by the first device, wherein when the second device plays the audio associated with the media file being played by the first device, the first device is muted; and
(6) the fourth instructions for the second device to simultaneously play the audio associated with the media file being played by the first device.

6. The method of claim 1, further comprising:
receiving a first request from the first device to communicate to the second device;
retrieving the second local IP address of the second device; and
forwarding the second local IP address of the second device to the first device to allow the first device to send communications to the second device without sending the data outside of the local network.

7. The method of claim 1, wherein the information related to the media file being played by the first device comprises (5) the third instructions for the second device to play the audio associated with the media file being played by the first device, wherein when the second device plays the audio associated with the media file being played by the first device, the first device is muted.

8. The method of claim 1, wherein the information related to the media file being played by the first device comprises (6) the fourth instructions for the second device to simultaneously play the audio associated with the media file being played by the first device.

9. A system comprising:
one or more processing modules; and
one or more non-transitory storage modules storing computing instructions configured to run on the one or more processing modules and perform acts of:
establishing a first connection with a first device;
determining a first remote Internet Protocol (IP) address of the first device;
establishing a second connection with a second device;
determining a second remote IP address of the second device;
requesting a first local IP address of the first device;
requesting a second local IP address of the second device;
storing first communication information for the first device, the first communication information comprising the first local IP address and at least one first timestamp indicating at least one time at which the first local IP address of the first device was received;
storing second communication information for the second device, the second communication information comprising the second local IP address and at least one second timestamp indicating at least one time at which the second local IP address of the second device was received;
determining that the first device and the second device are operating on a local network; and
using the first communication information and the second communication information to allow the first device to communicate with the second device and also transmit data from the first device to the second device without sending the data outside of the local network, the data comprising information related to a media file being played by the first device and configured to allow the second device to communicate the information related to the media file being played by the first device, the information related to the media file being played by the first device comprising:
(a) a social media comment made by a first social media account about contents of the media file being played by the first device, wherein a second social media account logged into a social media application on the second device is subscribed to the first social media account; and
(b) one or more of:
(1) first instructions for the second device to act as a remote control for the first device;
(2) second instructions for the second device to simultaneously play the media file being played by the first device;

(3) information indicating that the second device is not authorized to play the media file being played by the first device;
(4) information indicating an elapsed time of the media file being played by the first device;
(5) third instructions for the second device to play audio associated with the media file being played by the first device, wherein the second device plays the audio associated with the media file being played by the first device, the first device is muted; or
(6) fourth instructions for the second device to simultaneously play the audio associated with the media file being played by the first device.

10. The system of claim 9, wherein the computing instructions further comprise:
   requesting a first service set identification (SSID) to which the first device is connected;
   requesting a second SSID to which the second device is connected; and
   confirming that the first SSID is the same as the second SSID before forwarding the second local IP address of the second device to the first device.

11. The system of claim 9, wherein the computing instructions further comprise:
   requesting a first media access control (MAC) address associated with the first device; and
   requesting a second MAC address associated with the second device.

12. The system of claim 9, wherein the computing instructions further comprise:
   determining how old the first local IP address is using the at least one first timestamp;
   determining how old the second local IP address is using the at least one second timestamp;
   requesting first updated communication information from the first device if the first remote IP address or the first local IP address is determined to be older than a predetermined amount of time; and
   requesting second updated communication information from the second device if the second local IP address is determined to be older than a certain amount of time.

13. The system of claim 9, wherein the information related to the media file being played by the first device comprises:
   (1) the first instructions for the second device to act as the remote control for the first device;
   (2) the second instructions for the second device to simultaneously play the media file being played by the first device;
   (3) the information indicating that the second device is not authorized to play the media file being played by the first device;
   (4) the information indicating the elapsed time of the media file being played by the first device;
   (5) the third instructions for the second device to play the audio associated with the media file being played by the first device, wherein when the second device plays the audio associated with the media file being played by the first device, the first device is muted; and
   (6) the fourth instructions for the second device to simultaneously play the audio associated with the media file being played by the first device.

14. The system of claim 9, wherein the computing instructions further comprise:
   receiving a first request from the first device to communicate to the second device;
   retrieving the second local IP address of the second device; and
   forwarding the second local IP address of the second device to the first device to allow the first device to send communications to the second device without sending the data outside of the local network.

15. The system of claim 9, wherein the information related to the media file being played by the first device comprises (5) the third instructions for the second device to play the audio associated with the media file being played by the first device, wherein when the second device plays the audio associated with the media file being played by the first device, the first device is muted.

16. The system of claim 9, wherein the information related to the media file being played by the first device comprises (6) the fourth instructions for the second device to simultaneously play the audio associated with the media file being played by the first device.

17. A non-transitory computer readable storage medium storing one or more programs configured for execution by a computing device, the one or more programs comprising instructions that, when executed, perform acts of:
   establishing a first connection with a first device;
   determining a first remote Internet Protocol (IP) address of the first device;
   establishing a second connection with a second device;
   determining a second remote IP address of the second device;
   requesting a first local IP address of the first device;
   requesting a second local IP address of the second device;
   storing first communication information for the first device, the first communication information comprising the first local IP address, and at least one first timestamp indicating at least one time at which the first local IP address of the first device was received;
   storing second communication information for the second device, the second communication information comprising the second local IP address and at least one second timestamp indicating at least one time at which the second local IP address of the second device was received;
   determining that the first device and the second device are operating on a local network; and
   using the first communication information and the second communication information to allow the first device to communicate with the second device and also transmit data from the first device to the second device without sending the data outside of the local network, the data comprising information related to a media file being played by the first device and configured to allow the second device to communicate the information related to the media file being played by the first device, the information related to the media file being played by the first device comprising:
      (a) a social media comment made by a first social media account about contents of the media file being played by the first device, wherein a second social media account logged into a social media application on the second device is subscribed to the first social media account; and
      (b) one or more of:
         (1) first instructions for the second device to act as a remote control for the first device;
         (2) second instructions for the second device to simultaneously play the media file being played by the first device;

(3) information indicating that the second device is not authorized to play the media file being played by the first device;

(4) information indicating an elapsed time of the media file being played by the first device;

(5) third instructions for the second device to play audio associated with the media file being played by the first device, wherein when the second device plays the audio associated with the media file being played by the first device, the first device is muted; or (6) fourth instructions for the second device to simultaneously play the audio associated with the media file being played by the first device.

18. The non-transitory computer readable storage medium of claim 17, wherein the one or more programs further comprise instructions that, when executed, perform acts of:

receiving a first request from the first device to communicate to the second device;

retrieving the second local IP address of the second device; and forwarding the second local IP address of the second device to the first device to allow the first device to send communications to the second device without sending the data outside of the local network.

19. The non-transitory computer readable storage medium of claim 17, wherein the one or more programs further comprise instructions that, when executed, perform acts of:

requesting a first service set identification (SSID) to which the first device is connected;

requesting a second SSID to which the second device is connected; and confirming that the first SSID is the same as the second SSID before forwarding the second local IP address of the second device to the first device.

20. The non-transitory computer readable storage medium of claim 17, wherein the one or more programs further comprise instructions that, when executed, perform acts of:

requesting a first media access control (MAC) address associated with the first device; and requesting a second MAC address associated with the second device.

21. The non-transitory computer readable storage medium of claim 17, wherein the one or more programs further comprise instructions that, when executed, perform acts of:

determining how old the first local IP address is using the at least one first timestamp;

determining how old the second local IP address is using the at least one second timestamp;

requesting first updated communication information from the first device if the first local IP address is determined to be older than a predetermined amount of time; and requesting second updated communication information from the second device if the second local IP address is determined to be older than a certain amount of time.

22. The non-transitory computer readable storage medium of claim 17, wherein the information related to the media file being played by the first device comprises (6) the fourth instructions for the second device to simultaneously play the audio associated with the media file being played by the first device.

* * * * *